US012170818B2

(12) United States Patent
Venetucci et al.

(10) Patent No.: US 12,170,818 B2
(45) Date of Patent: *Dec. 17, 2024

(54) METHODS AND APPARATUS TO CALIBRATE AUDIENCE MEASUREMENT RATINGS BASED ON RETURN PATH DATA

(71) Applicant: The Nielsen Company (US), LLC, New York, NY (US)

(72) Inventors: Anthony P. Venetucci, Hampshire, IL (US); David J. Kurzynski, South Elgin, IL (US); Molly Poppie, Arlington Heights, IL (US); Jonathan Sullivan, Hurricane, UT (US); Bruce Hoynoski, Oldsmar, FL (US); Christine Pierce, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,538

(22) Filed: Jun. 8, 2023

(65) Prior Publication Data
US 2023/0319351 A1 Oct. 5, 2023

Related U.S. Application Data

(63) Continuation of application No. 17/851,990, filed on Jun. 28, 2022, now Pat. No. 11,716,511, which is a (Continued)

(51) Int. Cl.
*H04N 21/45* (2011.01)
*H04H 20/00* (2009.01)
(Continued)

(52) U.S. Cl.
CPC ........ *H04N 21/4524* (2013.01); *H04H 20/00* (2013.01); *H04H 60/64* (2013.01);
(Continued)

(58) Field of Classification Search
CPC .......... H04N 21/4383; H04N 21/4524; H04N 21/44213; H04N 21/4756
See application file for complete search history.

(56) References Cited

U.S. PATENT DOCUMENTS

| 4,816,904 A | 3/1989 | McKenna et al. |
| 6,983,478 B1 | 1/2006 | Grauch et al. |

(Continued)

OTHER PUBLICATIONS

United States Patent and Trademark Office, "Non-Final Office Action," issued in connection with U.S. Appl. No. 15/693,137, dated Apr. 19, 2018, 15 pages.
(Continued)

*Primary Examiner* — An Son P Huynh

(57) ABSTRACT

Methods and apparatus to calibrate media ratings based on return path data are disclosed. An apparatus includes programmable circuitry to execute machine readable instructions to: determine a subscriber calibration factor for media based on first panel tuning information obtained from first metering devices in first panelist households that subscribe to a content provider that provides media through return path data (RPD) devices; determine a nonsubscriber calibration factor for the media based on second panel tuning information obtained from second metering devices in second panelist households that do not subscribe to the content provider; and determine a final rating for the media based on an initial rating and at least one of the subscriber calibration factor or the nonsubscriber calibration factor, the initial rating based on RPD tuning information obtained from RPD devices in subscriber households that subscribe to the content provider.

20 Claims, 7 Drawing Sheets

Related U.S. Application Data continuation of application No. 17/387,878, filed on Jul. 28, 2021, now Pat. No. 11,405,690, which is a continuation of application No. 16/779,008, filed on Jan. 31, 2020, now Pat. No. 11,089,365, which is a continuation of application No. 16/382,848, filed on Apr. 12, 2019, now Pat. No. 10,560,744, which is a continuation of application No. 15/693,137, filed on Aug. 31, 2017, now Pat. No. 10,277,944.

(60) Provisional application No. 62/428,344, filed on Nov. 30, 2016.

(51) Int. Cl.
| | | |
|---|---|---|
| *H04H 60/64* | (2008.01) | |
| *H04N 21/25* | (2011.01) | |
| *H04N 21/258* | (2011.01) | |
| *H04N 21/438* | (2011.01) | |
| *H04N 21/442* | (2011.01) | |
| *H04N 21/475* | (2011.01) | |
| *H04N 21/658* | (2011.01) | |
| *H04H 60/51* | (2008.01) | |
| *H04H 60/66* | (2008.01) | |

(52) U.S. Cl.
CPC ..... *H04N 21/251* (2013.01); *H04N 21/25891* (2013.01); *H04N 21/4383* (2013.01); *H04N 21/44213* (2013.01); *H04N 21/44222* (2013.01); *H04N 21/4756* (2013.01); *H04N 21/6582* (2013.01); *H04H 60/51* (2013.01); *H04H 60/66* (2013.01)

(56) References Cited

U.S. PATENT DOCUMENTS

| | | | |
|---|---|---|---|
| 7,937,725 B1 | 5/2011 | Schaffer et al. | |
| 7,954,120 B2 | 5/2011 | Roberts et al. | |
| 8,014,756 B1 | 9/2011 | Henderson | |
| 8,589,229 B2* | 11/2013 | Laffey | G01C 21/3682 |
| | | | 455/457 |
| 8,667,520 B2 | 3/2014 | Bhatia et al. | |
| 8,774,018 B1 | 7/2014 | Burnette | |
| 8,904,419 B2 | 12/2014 | Vinson et al. | |
| 8,984,547 B2 | 3/2015 | Lambert et al. | |
| 9,204,189 B1 | 12/2015 | Oztaskent et al. | |
| 9,344,509 B1 | 5/2016 | Serboncini et al. | |
| 9,420,320 B2 | 8/2016 | Doe | |
| 9,420,323 B2 | 8/2016 | McMillan | |
| 9,578,361 B2 | 2/2017 | Doe | |
| 11,405,690 B2 | 8/2022 | Venetucci et al. | |
| 2002/0056087 A1 | 5/2002 | Berezowski et al. | |
| 2002/0104083 A1 | 8/2002 | Hendricks et al. | |
| 2003/0051240 A1 | 3/2003 | Schaffer et al. | |
| 2004/0187148 A1 | 9/2004 | Cassella | |
| 2005/0149964 A1 | 7/2005 | Thomas et al. | |
| 2006/0123451 A1 | 6/2006 | Preisman | |
| 2007/0136753 A1* | 6/2007 | Bovenschulte | H04N 7/17318 |
| | | | 348/E7.071 |
| 2007/0143775 A1 | 6/2007 | Savoor et al. | |
| 2008/0300965 A1 | 12/2008 | Doe | |
| 2010/0304663 A1* | 12/2010 | Michalski | H04L 12/1859 |
| | | | 455/3.02 |
| 2012/0110027 A1 | 5/2012 | Falcon | |
| 2012/0254911 A1 | 10/2012 | Doe | |
| 2012/0278179 A1 | 11/2012 | Campbell et al. | |
| 2013/0006703 A1* | 1/2013 | Hines | G06Q 30/02 |
| | | | 705/7.29 |
| 2014/0053173 A1 | 2/2014 | Oh et al. | |
| 2014/0068692 A1* | 3/2014 | Archibong | H04N 21/6334 |
| | | | 725/116 |
| 2014/0101686 A1 | 4/2014 | Kitts et al. | |
| 2014/0317660 A1 | 10/2014 | Cheung et al. | |
| 2015/0234820 A1* | 8/2015 | Aravamudan | H04N 21/4826 |
| | | | 707/769 |
| 2015/0262201 A1 | 9/2015 | Rao et al. | |
| 2015/0358667 A1 | 12/2015 | Bhatia et al. | |
| 2016/0029094 A1 | 1/2016 | Cheung et al. | |
| 2016/0249098 A1 | 8/2016 | Pecjak et al. | |
| 2016/0323616 A1 | 11/2016 | Doe | |
| 2017/0006322 A1* | 1/2017 | Dury | H04N 21/254 |
| 2018/0098102 A1* | 4/2018 | Browder | H04N 21/63345 |
| 2018/0131975 A1* | 5/2018 | Badawiyeh | H04N 21/2385 |
| 2020/0169786 A1 | 5/2020 | Venetucci et al. | |
| 2021/0360320 A1 | 11/2021 | Venetucci et al. | |

OTHER PUBLICATIONS

United States Patent and Trademark Office, "Notice of Allowance and Fee(s) Due," issued in connection with U.S. Appl. No. 15/693,137, dated Dec. 19, 2018, 17 pages.

United States Patent and Trademark Office, "Notice of Allowance and Fee(s) Due," mailed in connection with U.S. Appl. No. 16/382,848, dated Oct. 2, 2019, 15 pages.

United States Patent and Trademark Office, "Notice of Allowance and Fee(s) Due" issued in connection with U.S. Appl. No. 16/779,008 dated Apr. 1, 2021, 17 pages.

United States Patent and Trademark Office, "Notice of Allowance and Fee(s) Due," issued in connection with U.S. Appl. No. 17/387,878, dated Apr. 6, 2022, 15 pages.

United States Patent and Trademark Office, "Notice of Allowance and Fee(s) Due," issued in connection with U.S. Appl. No. 17/851,990, dated Mar. 8, 2023, 15 pages.

* cited by examiner

METHODS AND APPARATUS TO CALIBRATE AUDIENCE MEASUREMENT RATINGS BASED ON RETURN PATH DATA

CROSS-REFERENCE TO RELATED APPLICATION(S)

This patent arises from a continuation of U.S. patent application Ser. No. 17/851,990 (now U.S. Pat. No. 11,716,511), which was filed on Jun. 28, 2022, and which claims priority to U.S. patent application Ser. No. 17/387,878 (now U.S. Pat. No. 11,405,690), which was filed on Jul. 28, 2021, and which claims priority to U.S. patent application Ser. No. 16/779,008 (now U.S. Pat. No. 11,089,365), which was filed on Jan. 31, 2020, and which claims priority to U.S. patent application Ser. No. 16/382,848 (Now U.S. Pat. No. 10,560,744), which was filed on Apr. 12, 2019, and which claims priority to U.S. patent application Ser. No. 15/693,137 (Now U.S. Pat. No. 10,277,944), which was filed on Aug. 31, 2017, and which claims the benefit of U.S. Provisional Patent Application No. 62/428,344, which was filed on Nov. 30, 2016. U.S. patent application Ser. No. 17/851,990, U.S. patent application Ser. No. 17/387,878, U.S. patent application Ser. No. 16/779,008, U.S. patent application Ser. No. 16/382,848, U.S. patent application Ser. No. 15/693,137, and U.S. Provisional Patent Application No. 62/428,344 are hereby incorporated herein by reference in their entireties.

FIELD OF THE DISCLOSURE

This disclosure relates generally to audience measurement and, more particularly, to methods and apparatus to calibrate media ratings based on return path data.

BACKGROUND

Many people access media through set top boxes (STBs) or other media presentation devices provided by media content providers (e.g., cable media providers, satellite media providers, etc.). Some STBs are equipped to report tuning information indicative of the media accessed by the STBs back to the content providers. Tuning information reported back to content providers via STBs or other similar devices is sometimes referred to as return path data (RPD). RPD tuning information may be used by audience measurement entities to track or monitor people's exposure to media.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
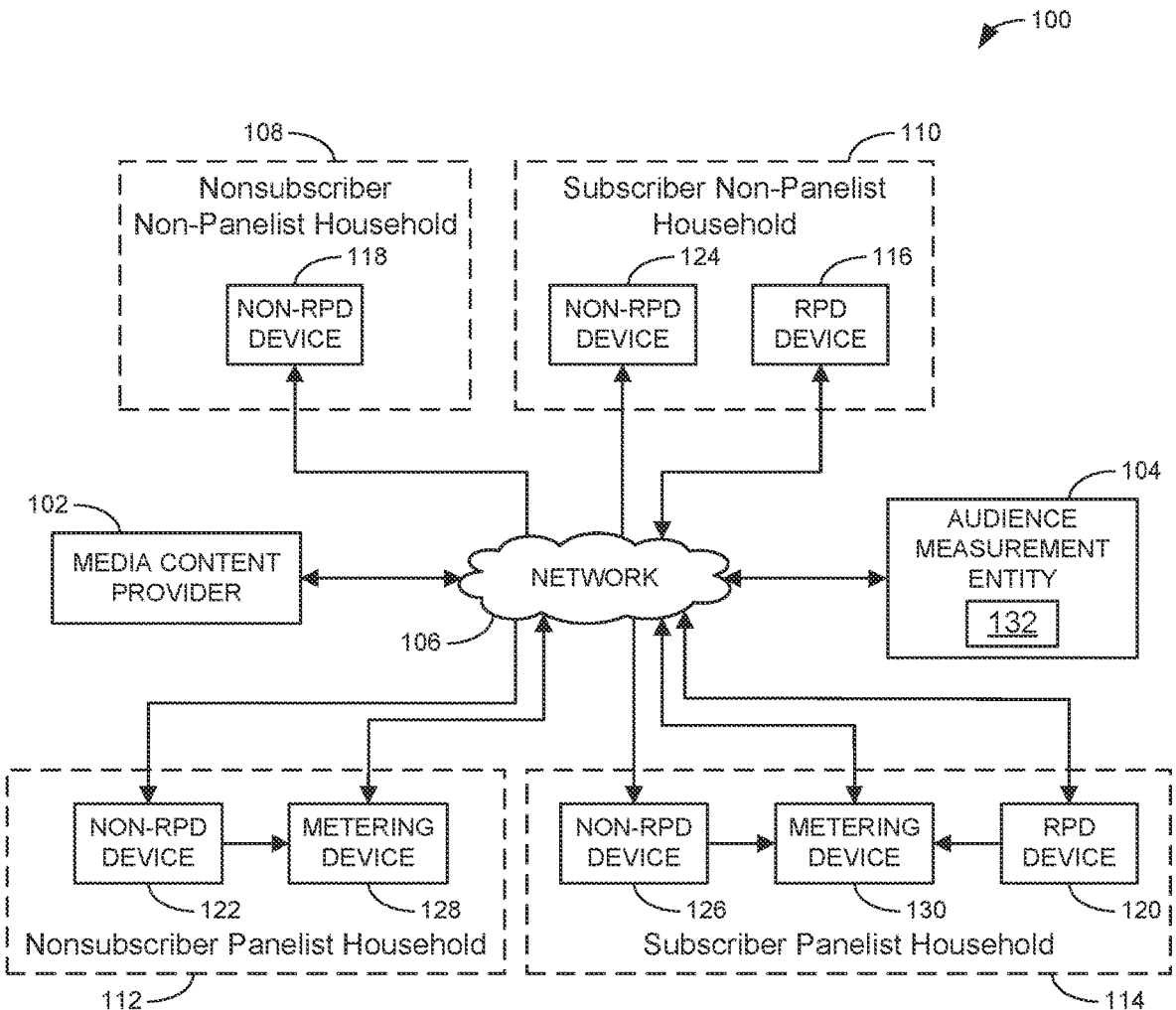
FIG. 1 is an example environment in which the teachings disclosed herein may be implemented.

In the past, audience measurement entities (AMEs) such as, for example, the Nielsen Company (US) LLC, have relied on audience measurement panelists to collect and/or measure audience measurement data used to generate audience metrics such as, for example, media ratings indicative of the number of households tuned to particular media programs at a given point in time. Typically, media ratings, or simply ratings, are expressed as a percentage of households relative to the entire universe or population of interest. The population of interest may be the entire country or a more specific geographic region (e.g., a designated market area (DMA) or other local market area). DMAs may range in size from several million households for a large metropolitan area down to a few thousand households in a rural market area.

Typically, national ratings are generated based on audience measurement data collected via people meters installed in statistically selected panelist households. The people meters monitor the exposure of panelists to media and automatically report such data to an AME for subsequent analysis and processing. While some larger local market areas may have a sufficient number of panelist households with people meters to generate ratings specific to the local market area, the sample size of panelist households in many smaller local markets is not large enough to generate statistically reliable ratings for the particular local market in question. Furthermore, increasing the number of panelist households with automated people meter systems is cost prohibitive. Accordingly, in the past, AMEs have relied on additional panelists in the smaller local market areas to record their media consumption behavior in paper diaries over specified periods of time and then to mail the completed diaries to the AME for subsequent analysis and processing. While paper diaries provide a relatively inexpensive method to increase the sample size and, thus, reliability of ratings, what panelists record in the paper diaries may not always be accurate, thereby introducing potential biases in the data. Furthermore, it has become increasingly difficult to recruit certain demographics (e.g., relatively young audience members) to volunteer as panelists and/or consistently complete the paper diaries. Further still, diary samples often favor highly rated broadcast stations while neglecting smaller broadcast or cable networks such that the collected panel data may not be fully representative for reliable analysis.

More recently, as technology has advanced, AMEs have turned to tuning information collected, measured, and/or reported from RPD devices as an alternate source of data that may be used to generate ratings for media among other audience measurement metrics. As used herein, an RPD device refers to any type of media device (e.g., a STB or other similar device) that is capable of accessing media from a content provider and reporting tuning information regarding the media accessed back to the content provider. Such tuning information is referred to herein as RPD tuning information or simply RPD. Using RPD tuning information for audience metrics has the advantage that it is relatively inexpensive to obtain because it may be implemented substantially automatically based on software installed on processors associated with the RPD devices reporting the RPD tuning information via any suitable network (e.g., the Internet). Not only is RPD tuning information relatively inexpensive to collect based on modern computer technology that makes the reporting of such RPD tuning information possible, RPD tuning information is also advantageous in that it may be collected from much larger quantities of households than possible through traditional audience measurement panels. For example, RPD tuning information may be collected from virtually every household that includes an RPD device because the report of RPD tuning information is often set as the default option for such devices at the time of manufacture.

While RPD tuning information provides these advantages, there are challenges with relying exclusively on RPD tuning information for purposes of audience measurement. Despite the large number of households that have RPD devices, there are still many households that may not subscribe to a media content provider and, therefore, not employ an RPD device to access media. As a result, the media exposure of audience members in such households would not be accounted for by collected RPD tuning information.

Furthermore, even where a household does have an RPD device to report tuning information (e.g., the household subscribes to a media content provider), the same household may have other media devices that are not capable of reporting RPD tuning information referred to herein as non-RPD devices. As a result, media exposure of audience members in such households via a non-RPD device would not be account for by collected RPD tuning information. Therefore, RPD tuning information collected in a local market area does not account for all media exposure and, thus, may be biased or otherwise not representative of the entire population in the local market.

Examples methods, apparatus, and articles of manufacture disclosed herein overcome at least some of the limitations associated with determining media ratings in local markets based on local RPD tuning information by using panel tuning information collected in the surrounding region to the local market to calculate calibration factors that may be used to correct biases in the RPD tuning information.

FIG. 1 is an example environment 100 in which the teachings disclosed herein may be implemented. In the illustrated example, a content provider 102 provides media to content subscribers and collects RPD tuning information indicative of the subscribers accessing the media. The content provider 102 may provide the RPD tuning information to an audience measurement entity (AME) 104 to enable to the AME 104 to generate audience measurement metrics. In some examples, the content provider 102 and the AME 104 communicate via a network 106 such as, for example, the Internet.

As shown in FIG. 1, the example environment 100 includes a nonsubscriber non-panelist household 108, a subscriber non-panelist household 110, a nonsubscriber panelist household 112, and a subscriber panelist household 114. The nonsubscriber and subscriber panelist households 112, 114 (collectively referred to as panelist households) represent households that have members that have enrolled as panelists with the AME 104. In some examples, panelists correspond to a statistically selected subset of all potential audience members that is representative of a whole population of interest. In some such panel-based monitoring systems, the panelists agree to provide detailed demographic information about themselves. In this manner, detailed exposure metrics are generated based on collected media exposure data and associated user demographics, which can then be statistically extrapolated to an entire population of interest (e.g., a local market, a national market, a demographic segment, etc.).

In the illustrated example, the nonsubscriber and subscriber non-panelist households 108, 110 (collectively referred to as non-panelist households) differ from each other in that the subscriber non-panelist household 110 includes an RPD device 116 whereas the nonsubscriber non-panelist household 108 does not. Instead, the nonsubscriber non-panelist household 108 includes a non-RPD device 118. Similar to the non-panelist households 108, 110, in the illustrated example, the panelist households 112, 114 differ from each other in that the subscriber panelist household 114 includes an RPD device 120 whereas the nonsubscriber panelist household 112 does not. Instead, the nonsubscriber panelist household 112 includes a non-RPD device 122. As described above, an RPD device, as used herein, is any type of media device capable of accessing media from a media content provider 102 and reporting RPD tuning information back to the content provider. By contrast, a non-RPD device, as used herein, refers to any type of media device that is capable of accessing and/or playing media from a content provider 102 but that does not have the capability to report RPD tuning information back to the content provider.

In the illustrated example of FIG. 1, the subscriber non-panelist household 110 and the subscriber panelist household 114 include the RPD devices 116, 120 because the households 110, 114 are subscribers to the content provider 102. Accordingly, for purposes of explanation, the subscriber non-panelist household 110 and the subscriber panelist household 114 are collectively referred to herein as subscriber households. In some examples, the RPD devices 116, 120 are provided by the content provider 102 when the households 110, 114 initially become subscribers to enable access to media generated by content provider 102. As shown in the illustrated example, the RPD devices 116, 120 may access media from the content provider 102 and report RPD tuning information to the content provider 102 via the network 106.

The nonsubscriber non-panelist household 108 and the nonsubscriber panelist household 112 are collectively referred to herein as nonsubscriber households because they correspond to households that do not have a subscription with the content provider 102. In some examples, there may be households that subscribe to the content provider 102 but do not have equipment capable of reporting RPD tuning information (i.e., an RPD device) because, for example, such households use older equipment. Although such households have a subscription with the content provider 102, such households are classified with the nonsubscriber households 108, 112 because they do not have the capability to report RPD tuning information. Further, some households may be subscribers to a particular content provider 102 with an RPD device that reports RPD tuning information to the content provider but the content provider does not provide such information to the AME 104. Such households are treated as nonsubscriber households for purposes of the teachings disclosed herein. That is, as used herein, the designation of subscriber household versus nonsubscriber household is based on whether the household includes an RPD device that reports RPD tuning information available to the AME 104. If so, the household is a subscriber household. If not, the household is a nonsubscriber household.

As shown in the illustrated example, the subscriber households 110, 114 may include non-RPD devices 124, 126 in addition to the RPD devices 116, 120. Thus, a subscriber household is any household that has at least one RPD device regardless of the number of non-RPD devices. A nonsubscriber household may have any number of non-RPD devices but does not have any RPD devices (i.e., capable of reporting RPD tuning information that is available to the AME 104).

In the illustrated example, the RPD devices 116, 120 may be standalone devices (e.g., STBs) that connect to separate media presentation devices, such as, television sets, radios, smartphones, tablets, computers, or any other device capable of playing the media accessed by the RPD devices 116, 120. Alternatively, the RPD devices 116, 120 may be integrated with a corresponding media presentation device capable of playing the media accessed by the RPD device (e.g., a smart television). Similarly, the non-RPD devices 118, 122, 124, 126 may be integrated media presentations devices or stand-alone devices (e.g., STBs) that connect to separate media presentation devices.

As described herein, only RPD devices are capable of reporting RPD tuning information to a content provider 102. Thus, in the illustrated example, RPD tuning information collected by the content provider 102 would be limited to media accessed via the RPD devices 116, 120 of the subscriber households 110, 114. Such data is incomplete to represent the exposure to media by all the households 108, 110, 112, 114 represented in FIG. 1. In particular, the RPD tuning information would not indicate any media exposure by audience members in the nonsubscriber households 108, 112. Further, while the RPD tuning information would convey some media to which audience members in the subscriber households 110, 114 were exposed, any media accessed via the non-RPD devices 124, 126 in the subscriber households 110, 114 is not accounted for in the reported RPD tuning information.

While the RPD tuning information collected from the RPD devices is insufficient to fully account for all media accessed in any of the households 108, 110, 112, 114, the AME 104 is at least able to fully account for all media accessed at the panelist households 112, 114. This is possible because the panelist households 112, 114 are provided with metering devices 128, 130 to track and/or monitor all media played in the households 112, 114 and report such to the AME 104 (e.g., via the network 106). In some examples, the metering devices 128, 130 also track and report who is being exposed to the media being played so that the media exposure can be associated with particular individuals and their associated demographics previously collected when the household members enrolled as panelists. While a single metering device 130 is shown in the subscriber panelist household 114 to monitor both the RPD device 120 and the non-RPD device 126, in some examples, a separate metering device 130 may be associated with each device to independently track and report media accessed by each device to the AME 104.

In the illustrated example of FIG. 1, the AME 104 includes a media ratings module 132 to calibrate ratings for media generated based on collected RPD tuning information as described more fully below. More particularly, the media ratings module 132 uses panel tuning information included in audience measurement data collected from subscriber panelist households (e.g., from the metering device 130 of the subscriber panelist household 114) to calculate a first calibration factor that accounts for media accessed via non-RPD devices in subscriber households in a region of interest (e.g., including media accessed via the non-RPD device 124 of the subscriber non-panelist household 110). Further, the media ratings module 132 uses panel tuning information collected from nonsubscriber panelist households (e.g., from the metering device 128 of the nonsubscriber panelist household 112) to calculate a second calibration factor that accounts for media accessed via non-RPD devices in nonsubscriber households in a region of interest (e.g., including media accessed via the non-RPD device 118 of the nonsubscriber non-panelist household 108). The first and second calibration factors are used to modify or adjust an initial media rating for a region of interest (e.g., a local market area) based exclusively on collected RPD tuning information (e.g., collected from the RPD devices 116, 120 of the subscriber households 110, 114) to produce an accurate final rating for the entire region of interest (e.g., that accounts for media exposure via the non-RPD devices 118, 122, 124, 126). Examples disclosed herein arrive at the final local rating without the need or expense of employing paper diaries or having a large sample size of panelists specifically located within the local market area.

Figure 2:
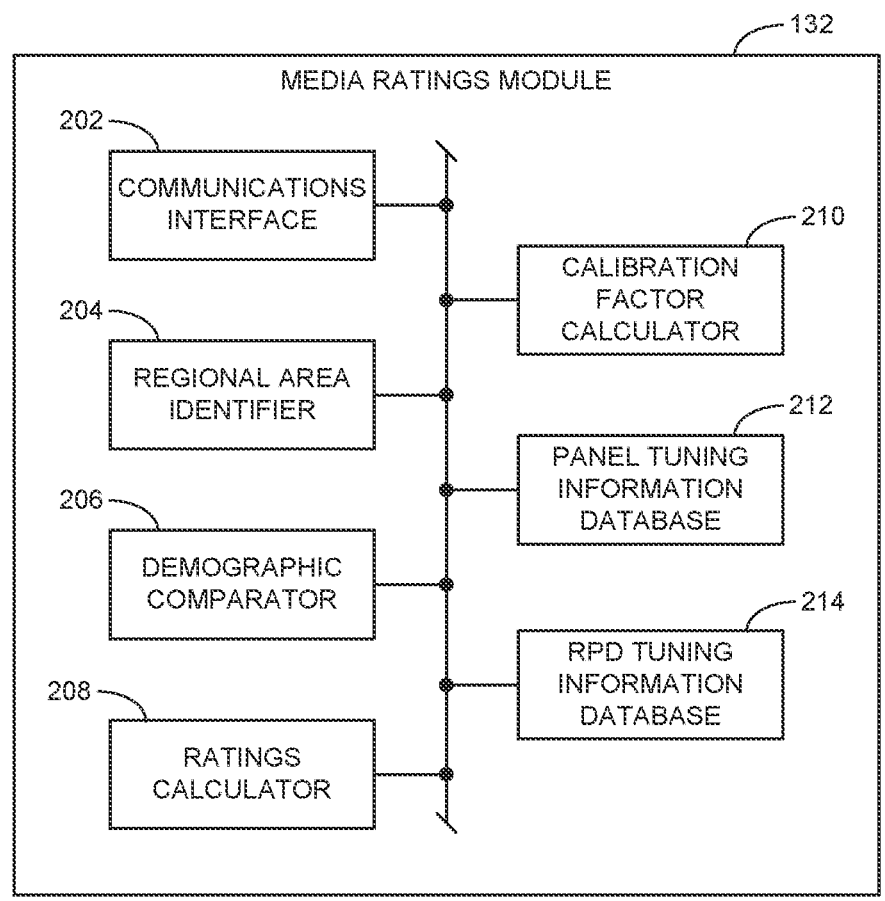
FIG. 2 is an example implementation of the example media ratings module of FIG. 1.

FIG. 2 is an example implementation of the example media ratings module 132 of FIG. 1. The example media ratings module 132 includes an example communications interface 202, an example regional area identifier 204, an example demographic comparator 206, an example ratings calculator 208, an example calibration factor calculator 210, an example panel tuning information database 212, and an example RPD tuning information database 214.

The example media ratings module 132 is provided with the example communications interface 202 to communicate with the metering devices 128, 130 installed in the panelist households 112, 114. That is, the metering devices 128, 130 may report audience measurement data to the AME 104 that is received by the communications interface 202. The communications interface 202 may receive audience measurement data from other panelist households not represented in the illustrated example. The collected audience measurement data includes panel tuning information, which may be stored in the panel tuning information database 212. The panel tuning information may include an indication of the media accessed via the associated media devices (e.g., the RPD device 120 or the non-RPD devices 122,126). In the illustrated example, the panel tuning information includes an identifier of the particular media device used to access the media and/or an indication of whether the media device is capable of reporting RPD tuning information (i.e., whether the media device is an RPD device). In some example, the media accessed by the media devices may be uniquely identified by the panel tuning information. In other examples, the panel tuning information may identify a particular source of media (e.g., a station ID) from which the particular media may be identified based on an associated timestamp included in the panel tuning information.

Additionally, in the illustrated example, the communications interface 202 of the media ratings module 132 receives RPD tuning information from the content provider 102. The content provider 102 collects the RPD tuning information reported from RPD devices (e.g., the RPD devices 116, 120) accessing media content provided by the content provider 102. In some examples, the communications interface 202 may receive the RPD tuning information directly from the RPD devices 116, 120 independent of communications between the AME 104 and the content provider 102. The RPD tuning information may be stored in the RPD tuning information database 214. Similar to the panel tuning information, the RPD tuning information includes a media identifier (e.g., a unique identifier, a station ID with an associated timestamp, etc.) to identify the media accessed by the RPD devices.

As mentioned above, a particular local market of interest (e.g., a relatively small DMA) may not have a sufficient number of panelists located therein to reliably generate media ratings for the local market. Further, while RPD tuning information collected from within the local market area may be obtained from a relatively larger number of subscriber households 110, 114, the subscriber households are unlikely to be representative of the entire population within the local market area because they exclude nonsubscriber households 108, 112. Accordingly, in some examples, panel tuning information collected from panelists in a larger surrounding region (referred to herein as a regional area) may be used, in conjunction with RPD tuning information collected from subscriber households 110, 114 in the regional area, to calibrate the RPD tuning information collected from within the local market area. The example media ratings module 132 is provided with the example regional area identifier 204 to identify the appropriate regional area surrounding the local market area that contains panelist households 112, 114 representative of those in the local market. In some examples, the local market of interest may be a DMA and the larger regional area may be a designated region containing the particular DMA as well as other adjacent DMAs. However, the local market and regional areas may be any suitable geographic areas. The regional area identifier 204 typically identifies a regional area that is larger than the local market area because the local market area does not contain a sufficient number of panelist households 112, 114 to statistically rely on data from within the local market area. However, in some examples, the local market area may be sufficiently large that the panel and/or RPD tuning information from panelists and/or subscriber households 110, 112, 114 limited to within the local market area are sufficient to reliably represent the local market.

Panelist households 112, 114 and/or subscriber households 110, 114 in the regional area may not be directly representative of households within the local market area (e.g., based on different compositions of demographic characteristics throughout the region). Accordingly, in some examples, the demographic comparator 206 compares the local market area with the surrounding regional area and assigns different weights to ones of the panelist households 112, 114 and subscriber households 110, 114 throughout the regional area to be representative of the households in the local market area based on one or more demographic characteristics.

In some examples, the panel tuning information collected from panelist households 112, 114 in the regional area, are compared against RPD tuning information collected from subscriber households 110, 114 in the regional area to calculate calibration factors for RPD tuning information specific to a local market area.

The example media ratings module 132 is provided with the example ratings calculator 208 to calculate ratings for media in a particular region of interest (e.g., a local market). In some examples, the ratings calculator 208 calculates ratings at a quarter-hour granularity. However, the ratings may be based on any other suitable time period. In some examples, the ratings calculator 208 may calculate an initial estimate for a rating of media provide in a local market area based exclusively on exposure to media indicated by collected RPD tuning information from within the local market area. For purposes of explanation, this initial estimate is referred to herein as the initial RPD-based local rating. As with the panelist households and subscriber households in the surrounding regional area, the subscriber households 110, 114 within the local market area may not be demographically representative of the entire population of the local market area. Accordingly, in some examples, the demographic comparator 206 assigns weights to the subscriber households 112, 114 within the local market area to better represent the total population. In some such examples, the initial RPD-based local rating is based on weighted RPD tuning information corresponding to the weights assigned to the subscriber households 112, 114 in the local market area from which the RPD tuning information was collected.

As a specific example, for purposes of explanation, assume that all households are equally weighted. In such an example, if a particular content provider 102 located in a local market area includes 10,000 subscriber households and 300 of the subscriber households reported RPD tuning information indicative of exposure to particular media, the initial RPD-based local rating for the media would be $(300/10,000) \times 100 = 3$. This initial RPD-based local rating is unlikely to be reflective of the actual percentage of all households in the local market area that accessed the media because it fails to account for when the media is accessed via non-RPD devices (in either subscriber households or non-subscriber households). Accordingly, in some examples, the ratings calculator 208 may calibrate the initial estimate to a final local rating that accounts for such households based on calculated calibration factors.

In some examples, the calibration factor calculator 210 calculates the calibration factors by leveraging the panel tuning information collected from panelist households 108, 112 in the surrounding regional area identified by the regional area identifier 204 and comparing it against RPD tuning information collected from subscriber households in the identified regional area. In some examples, the calibration factor calculator 210 calculates different calibration factors for media associated with different times of day, for different station groups, for different demographics of the households where the media was played, and/or for any other suitable characteristic. Furthermore, in some examples, the calibration factors are updated on a periodic or aperiodic basis. For example, new calibration factors may be calculated once a day.

In some examples, the calibration factor calculator 210 calculates two separate calibration factors (for each grouping of characteristics (e.g., daypart, station group, demographic break, etc.) based on different regional ratings calculated by the ratings calculator 208. More particularly, in addition to the initial RPD-based local rating, the ratings calculator 208 calculates a regional RPD-based subscriber rating based on RPD tuning information collected from subscriber households 110, 114 throughout the regional area surrounding the local market area. The ratings calculator 208 calculates the regional RPD-based subscriber rating for particular media as the percentage of all subscriber households in the regional area that reported RPD tuning information indicating access to the particular media. For example, assume the surrounding regional area being analyzed includes 1,000,000 subscriber households including 25,000 of which accessed the particular media of interest. Assuming all households are weighted equally for purposes of explanation, the regional RPD-based subscriber rating would be $(25,000/1,000,000) \times 100 = 2.5$. In other words, the regional RPD-based subscriber rating is calculated in the same way as the initial RPD-based local rating except that the RPD tuning information used is for the regional rating comes from households in a larger regional area rather than the local market area of interest.

Additionally, the ratings calculator 208 calculates two regional panelist cutback ratings based on the collected panel tuning information in the identified regional area. The regional panelist cutback ratings are referred to herein as cutback ratings because they are ratings based upon a subset of all panelists in the identified regional area. A first regional cutback rating corresponds to all panelist households in the regional area that are nonsubscriber households (e.g., the nonsubscriber panelist household 112 of FIG. 1). For example, assume that the regional area includes 3,000 panelist households including (a) 2,000 subscriber panelist households 114 (having at least one RPD device) and (b) 1,000 nonsubscriber panelist households 112 (having no RPD devices). Of the 1,000 nonsubscriber panelist households 112, further assume that 50 accessed the particular media of interest. In such a situation, the ratings calculator 208 calculates the first regional cutback rating (also referred to herein as the regional nonsubscriber panelist cutback rating) to be $(50/1,000) \times 100 = 5$. In some examples, the calibration factor calculator 210 uses the regional nonsubscriber panelist cutback rating to calculate a first calibration factor that accounts for media accessed by all nonsubscriber households 108, 112. The first calibration factor is referred to herein as the nonsubscriber calibration factor and is calculated as the ratio of the regional nonsubscriber panelist cutback rating to the regional RPD-based subscriber rating. That is, using the above example, a regional nonsubscriber panelist cutback rating of 5 and a regional RPD-based subscriber rating of 2.5 results in a nonsubscriber calibration factor of $5/2.5 = 2$. This nonsubscriber calibration factor indicates that nonsubscriber households 108, 112 were tuned to the particular media twice as often as reported by the RPD tuning information collected from the subscriber households 110, 114 throughout the regional area.

While the first cutback rating corresponds to nonsubscriber panelist households 108, 112, the second regional cutback rating corresponds to all panelist households in the regional area that are subscriber households (e.g., the subscriber panelist household 114 of FIG. 1). However, in some examples, when the ratings calculator 208 calculates this second regional cutback rating, only media accessed by non-RPD devices in such households is taken into account (e.g., the non-RPD device 122 of the nonsubscriber panelist household 112). Using the above example, of the 2,000 panelist households that are subscriber households 114, assume that 25 accessed the media of interest via a non-RPD device. In such a situation, the ratings calculator 208 calculates the second regional cutback rating (also referred to herein as the regional non-RPD subscriber panelist cutback rating) to be $(25/2,000) \times 100 = 1.25$. The calibration factor calculator 210 uses the regional non-RPD subscriber panelist cutback rating to calculate a second calibration factor that accounts for media accessed by all subscriber households 110, 114 via non-RPD devices 124, 126. The second calibration factor is referred to herein as the non-RPD subscriber calibration factor and is calculated as the ratio of the regional non-RPD subscriber panelist cutback rating to the regional RPD-based subscriber rating. That is, using the above example, a regional non-RPD subscriber panelist cutback rating of 1.25 and a regional RPD-based subscriber rating of 2.5 results in a nonsubscriber calibration factor of $1.25/2.5 = 0.5$. This non-RPD subscriber calibration factor indicates that subscriber households 110, 114 throughout the regional area were tuned to the particular media via a non-RPD device 124, 126 half as often as the subscriber households 110, 114 that accessed the media via RPD devices 116, 120.

After the ratings calculator 208 has calculated an initial estimate of a rating for media provided in the local market area based exclusively on the locally collected RPD tuning information (e.g., the initial RPD-based local rating) and the calibration factor calculator 210 has calculated the calibration factors, the ratings calculator 208 may calculate a final local rating for the local market. The final local rating is based on a weighted sum of a total subscriber local rating and a total nonsubscriber local rating. In some examples, the total nonsubscriber local rating is calculated as the product of the initial RPD-based local rating and the nonsubscriber calibration factor. Using the above example, an initial RPD-based local rating of 3 and a nonsubscriber calibration factor of 2 results in a total nonsubscriber local rating of $3 \times 2 = 6$. In some examples, the total subscriber local rating is calculated as the initial RPD-based local rating plus the product of the initial RPD-based local rating and the non-RPD subscriber calibration factor. Expressed differently, the total subscriber local rating is calculated as the initial RPD-based local rating multiplied by one plus the non-RPD subscriber calibration factor. Again, using the above example, an initial RPD-based local rating of 3 and a non-RPD subscriber calibration factor of 0.5 results in a total subscriber local rating of $3 \times (1+0.5) = 4.5$.

In some examples, the ratings calculator 208 sums the total subscriber local rating and the total nonsubscriber local rating multiplied by weighting factors based on the market penetration of the content provider 102 associated with the RPD devices in the local market area. In particular, the total subscriber local rating is multiplied by a subscriber penetration defined as the percentage of subscriber households 110, 114 in the local market area relative to all households in the local market area. The total nonsubscriber local rating is multiplied by a nonsubscriber penetration defined as one minus the subscriber penetration. Thus, assuming a subscriber penetration of 80% and, thus, a nonsubscriber penetration of 20%, the final local rating for the local market area is $(4.5 \times 80\%) + (6 \times 20\%) = 4.8$.

In some situations, while a content provider 102 may have a particular penetration in a local market of interest, certain media sources (e.g., particular television stations) provided by a content provider 102 may have limited coverage within the local market area. That is, particular media may be provided to only a portion of the subscriber households 110, 114 in the local market area of interest. In some such examples, each content provider 102 may have a different penetration and/or a different coverage for particular media. In such examples, the ratings calculator 208 may adjust rating calculations and penetration values to account for the partial coverage of the media with respect to the different content providers as explained more fully below in connection with FIG. 3.

Figure 3:
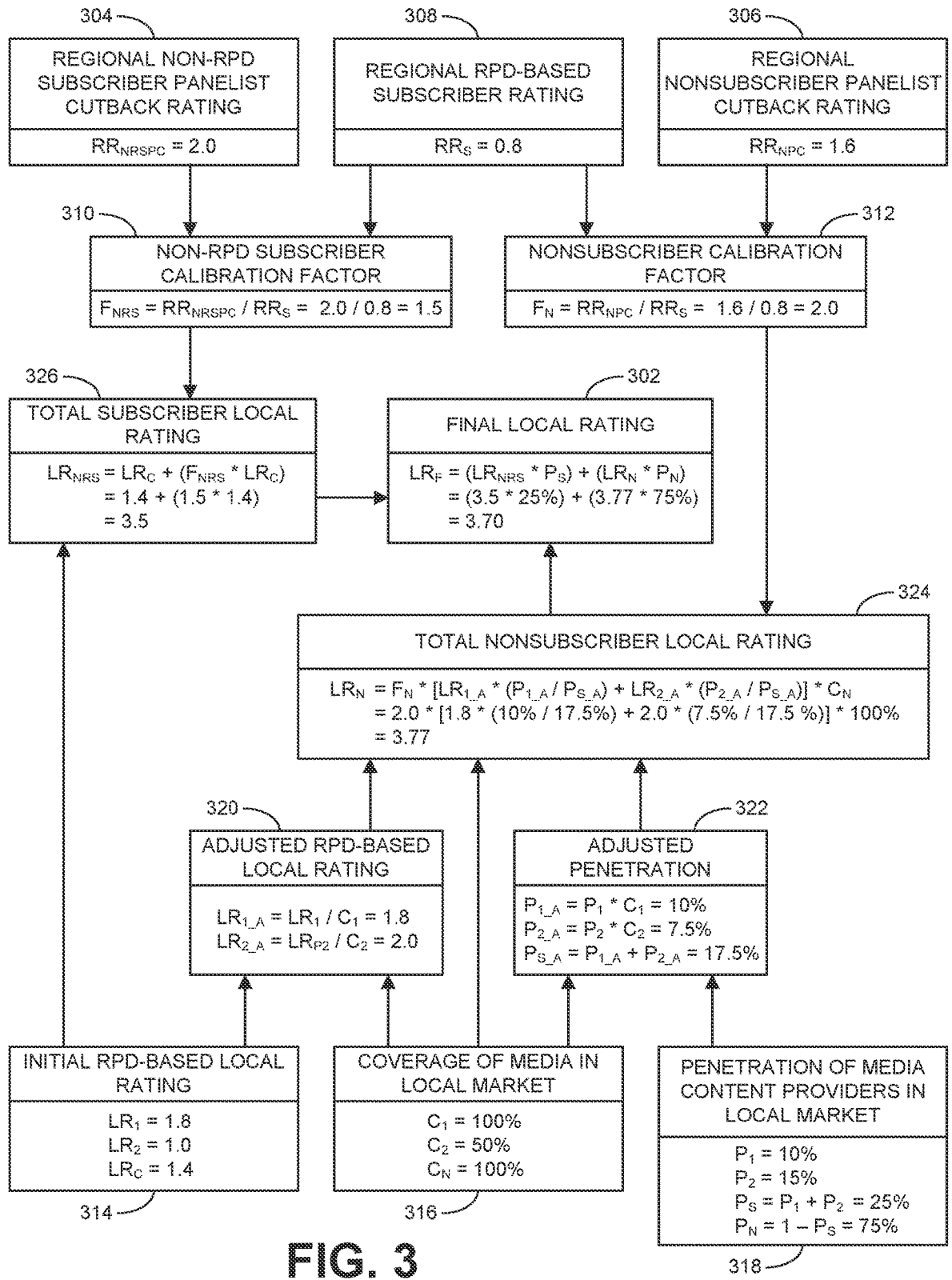
FIG. 3 is a block diagram illustrating calculations to determine a final local rating for media provided in a local market of interest based on RPD tuning information collected from two separate content providers.

FIG. 3 is a block diagram illustrating the relevant calculations to determine a final local rating (block 302) when the RPD tuning information is collected from two separate content providers 102. While FIG. 3 illustrates an example that involves two content providers 102, the example methodology described herein may be suitably adapted to any number of content providers. In the illustrated example, the top three blocks correspond to regional ratings (RR) including a regional non-RPD subscriber panelist cutback rating (block 304), a regional nonsubscriber panelist cutback rating (block 306), and a regional RPD-based subscriber rating (block 308). As shown in FIG. 3, a non-RPD subscriber calibration factor (block 310) is calculated as the ratio of the regional non-RPD subscriber panelist cutback rating (block 304) to the regional RPD-based subscriber rating (block 308). A nonsubscriber calibration factor (block 312) is calculated as the ratio of the regional nonsubscriber panelist cutback rating (block 306) to the regional RPD-based subscriber rating (block 308).

The bottom blocks of FIG. 3 represent information associated with the local market area of interest for which the final local rating is to be calculated. Block 314 represents the initial RPD-based local ratings for the local market area. These values represent the initial estimate of ratings for media provided in the local market area that are to be calibrated based on the calibration factors represented in blocks 310 and 312. In block 314 of the illustrated example, $LR_1$ represents a first RPD-based local rating corresponding to a first content provider 102 while $LR_2$ represents a second RPD-based local rating corresponding to a second content provider 102. $LR_C$ represents the combined RPD-based local rating for the local market based on RPD tuning information collected from both the first and second content providers 102.

Block 316 represents the coverage associated with each media source providing the particular media of interest. More particularly, $C_1$ represents the coverage associated with the first content provider 102, $C_2$ represents the coverage associated with the second content provider 102, and $C_N$ represents the coverage associated with nonsubscriber media sources.

Block 318 represents the penetration of each media source within the local market of interest. More particularly, $P_1$ represents the penetration of the first content provider 102 in the local market area, $P_2$ represents the penetration of the second content provider 102, and $P_S$ represents a subscriber penetration corresponding to a total of the individual content provider penetrations. Further, block 318 includes a nonsubscriber penetration ($P_N$) that is defined herein as one minus the total subscriber penetration (e.g., $1-P_S$).

As shown in the illustrated example, adjusted RPD-based local ratings for each content provider 102 is represented by block 320. The adjusted local ratings are calculated by dividing the initial local rating by the coverage associated with the corresponding content provider 102. Similarly, adjusted penetrations for each content provider 102 is represented by block 322 and calculated by multiplying the initial penetration by the associated coverage value.

The calculated values for the adjusted local ratings (block 320) and the adjusted penetrations (block 322) are used in combination with the nonsubscriber calibration factor (block 312) to calculate the total nonsubscriber local rating for the media of interest as represented by block 324. As shown in block 324 of the illustrated example, rather than multiplying the combined RPD-based local rating ($LR_C$) by the nonsubscriber calibration factor, the nonsubscriber calibration factor is multiplied by a sum of the individual local ratings for each media content weight-averaged based on the relative penetrations associated with each media content.

Block 326 represents the calculation of the total subscriber local rating for the media of interest. As shown in the illustrated example, this value is calculated as the sum of the combined RPD-based local rating and the combined RPD-based local rating multiplied by the non-RPD subscriber calibration factor.

With the total subscriber local rating (block 326) and the total nonsubscriber local rating (block 324) calculated, the final local rating may be calculated as represented by block 302. As described above, the final local rating corresponds to the weighted sum of the total subscriber local rating (block 326) and the total nonsubscriber local rating (block 324). As shown in the illustrated examples, the total subscriber local rating and the total nonsubscriber local rating are weighted in this calculation based on the total subscriber penetration value and the total nonsubscriber penetration value.

While an example manner of implementing the media ratings module 132 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example regional area identifier 204, the example demographic comparator 206, the example ratings calculator 208, the example calibration factor 210, the example panel tuning information database 212, the example RPD tuning information database 214, and/or, more generally, the example media ratings module 132 of FIG. 1 may be implemented by hardware, software, firmware and/or any combination of hardware, software and/or firmware. Thus, for example, any of the example communications interface 202, the example regional area identifier 204, the example demographic comparator 206, the example ratings calculator 208, the example calibration factor 210, the example panel tuning information database 212, the example RPD tuning information database 214, and/or, more generally, the example media ratings module 132 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example regional area identifier 204, the example demographic comparator 206, the example ratings calculator 208, the example calibration factor 210, the example panel tuning information database 212, and/or the example RPD tuning information database 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media ratings module 132 of FIG. 1 may include one or more elements, processes and/or devices in addition to, or instead of, those illustrated in FIG. 2, and/or may include more than one of any or all of the illustrated elements, processes and devices.

Figure 4:
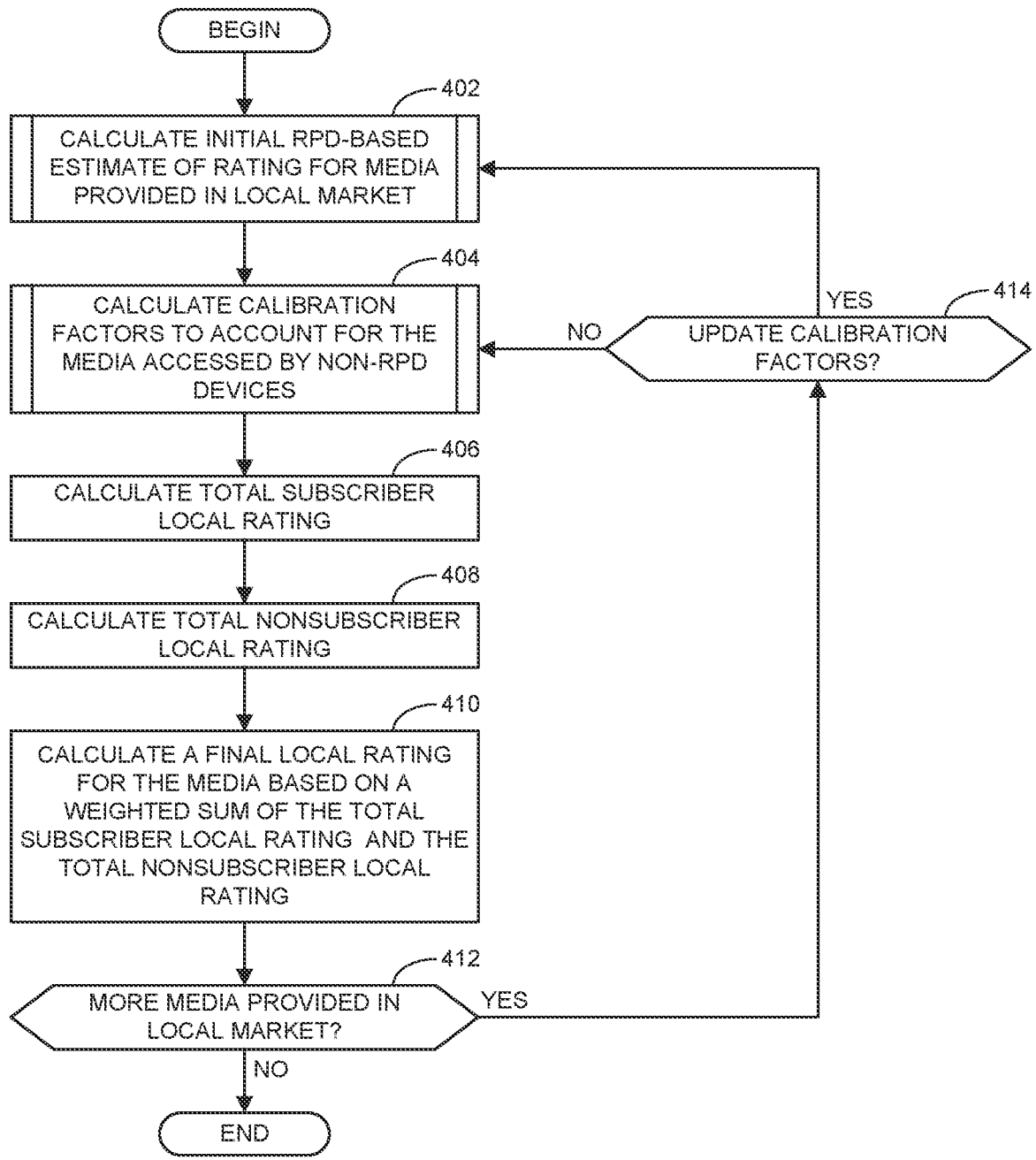
FIGS. 4-6 are flowcharts representative of example machine readable instructions that may be executed by one or more processors to implement the example media ratings module of FIGS. 1 and/or 2.
Figure 5:
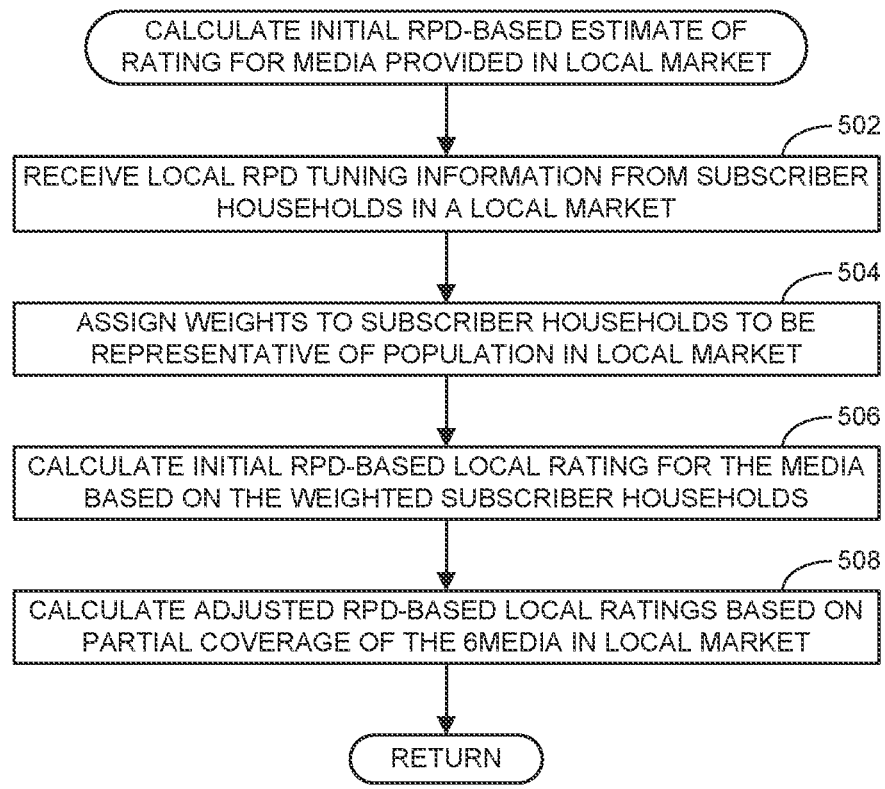
Figure 6:
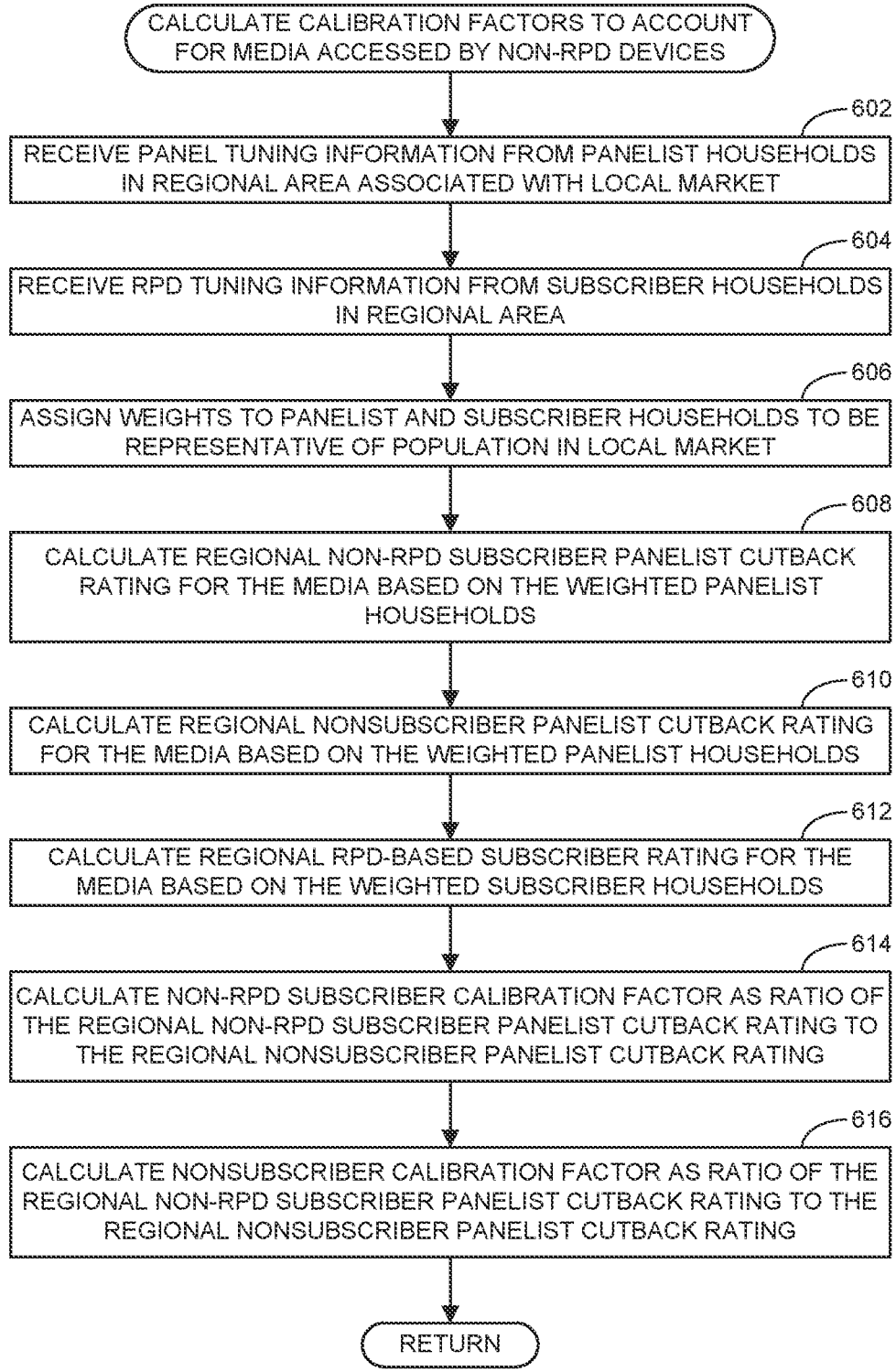

Flowcharts representative of example machine readable instructions for implementing the media ratings module 132 of FIG. 2 is shown in FIGS. 4-6. In this example, the machine readable instructions comprise a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4-6, many other methods of implementing the example media ratings module 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 4 begins at block 402 where the example ratings calculator 208 calculates an initial RPD-based estimate of a rating for media provided in a local market. Further detail regarding the implementation of block 402 is provided below in connection with FIG. 5. At block 404, the example calibration factor calculator 210 calculates calibration factors to account for the media accessed by non-RPD devices. Further detail regarding the implementation of block 404 is provided below in connection with FIG. 6. At block 406, the example ratings calculator 208 calculates a total subscriber local rating. At block 408, the example ratings calculator 208 calculates a total nonsubscriber local rating. At block 410, the example ratings calculator 208 calculates a final local rating for the media based on a weighted sum of the total subscriber local rating and the total nonsubscriber local rating. In some examples, the weighting is based on the penetration of subscribers relative to a nonsubscriber penetration. At block 412, the example media ratings module 132 determines whether more media has been provided in the local market. If so, control advances to block 414 where the example process determines whether to update the calibration factors. In some examples, the calibration factors are updated once a day. However, the calibration factors may be updated after any other suitable period of time. If the process determines to update the calibration factors (block 414), control returns to block 402 to repeat the example process. Otherwise, control returns to block 404. Returning to block 412, if the example media ratings module 132 determines that no more media has been provided in the local market, the example program of FIG. 4 ends.

FIG. 5 is a flowchart illustrating an example implementation of block 402 of FIG. 4. The example program of FIG. 5 begins at block 502 where the example communications interface 202 receives local RPD tuning information from subscriber households in a local market. While some of the subscriber households may be subscriber panelist households 114, it is likely that many will be subscriber non-panelist households 110. At block 504, the example demographic comparator 206 assigns weights to the subscriber households 110, 114 to be representative of the population in the local market. At block 506, the example ratings calculator 208 calculates an initial RPD-based local rating for the media based on the weighted subscriber households 110, 114. In some examples, where different ones of the subscriber households 110, 114 correspond to subscribers to multiple different media content providers 102, the ratings calculator 208 may calculate individual ratings based on the RPD tuning information associated with each content provider as well as a combined rating corresponding to all subscriber households 110, 114 regardless of the content provider. At block 508, the ratings calculator 208 calculates an adjusted RPD-based rating based on partial coverage of the media in the local market. In some examples, such as when the coverage of the media in the local market is 100%, block 508 may be omitted. Thereafter, the example process of FIG. 5 ends and returns to complete the process of FIG. 4.

FIG. 6 is a flowchart illustrating an example implementation of block 404 of FIG. 4. The example program of FIG. 6 begins at block 602 where the example communications interface 202 receives panel tuning information from panelist households 112, 114 in a regional area associated with the local market. At block 604, the example communications interface 202 receives RPD tuning information from subscriber households 110, 114 in the regional area. At block 606, the example demographic comparator 206 assigns weights to the panelist and subscriber households 110, 112, 114 to be representative of the population in the local market.

At block 608, the ratings calculator 208 calculates a regional non-RPD subscriber panelist cutback rating for the media based on the weighted panelist households 112, 114. At block 610, the ratings calculator 208 calculates a regional nonsubscriber panelist cutback rating for the media based on the weighted panelist households 112, 114. At block 612, the ratings calculator 208 calculates a regional RPD-based subscriber rating for the media based on the weighted subscriber households 110, 114.

At block 614, the example calibration factor calculator 210 calculates a non-RPD subscriber calibration factor as the ratio of the regional non-RPD subscriber panelist cutback rating to the regional RPD-based subscriber rating. At block 616, the example calibration factor calculator 210 calculates a nonsubscriber calibration factor as the ratio of the regional nonsubscriber panelist cutback rating to the regional RPD-based subscriber rating. Thereafter, the example process of FIG. 6 ends and returns to complete the process of FIG. 4.

Figure 7:
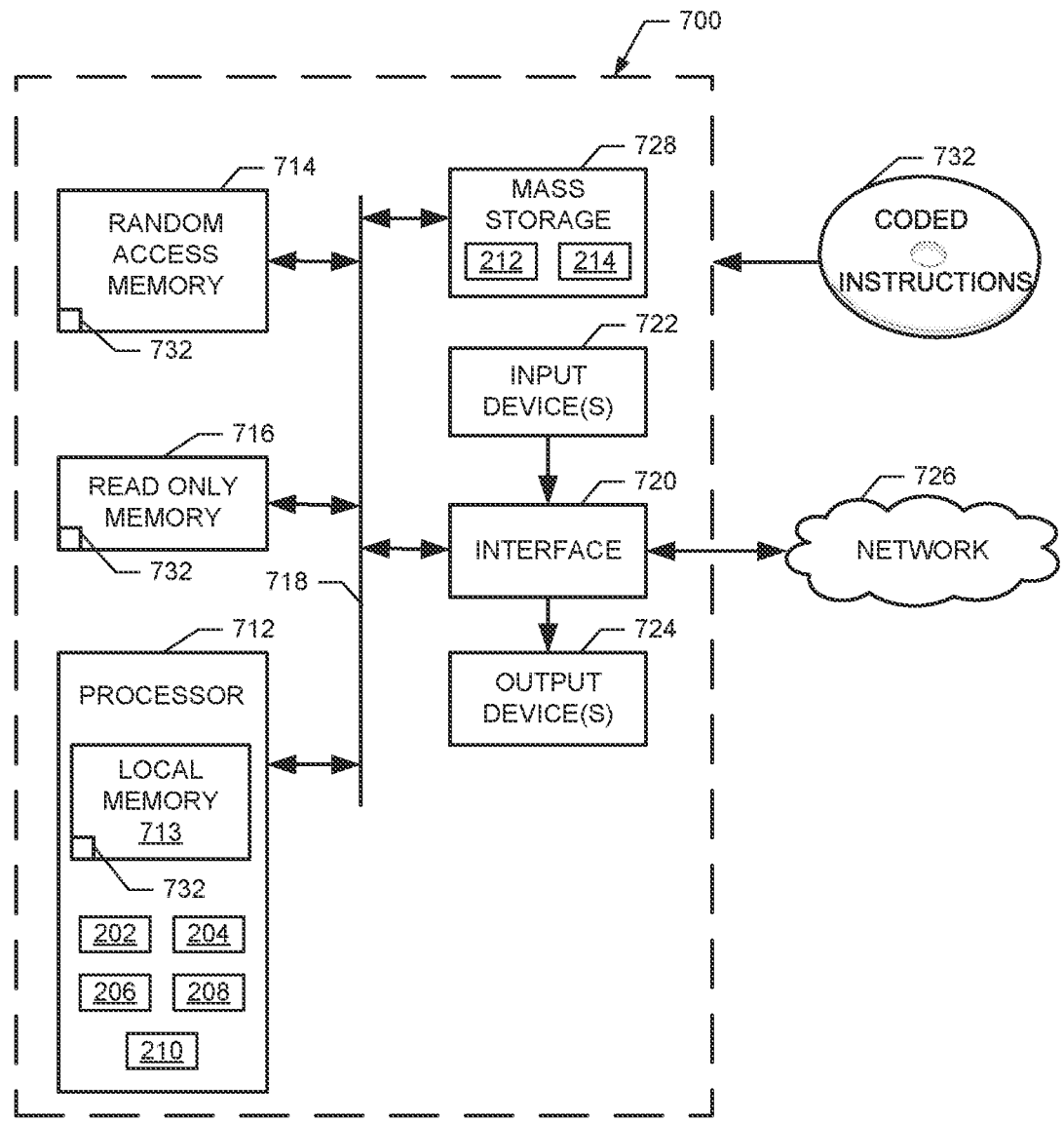
FIG. 7 is a schematic illustration of an example processing system that may be used and/or programmed to execute the example machine-readable instructions of FIGS. 4-6 to implement the example media ratings module of FIGS. 1 and/or 2.

FIG. 7 is a block diagram of an example processor platform 700 capable of executing the instructions of FIGS. 4-6 to implement the media ratings module 132 of FIG. 2. The processor platform 700 can be, for example, a server, a personal computer, a mobile device (e.g., a cell phone, a smart phone, a tablet such as an iPad™), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor implements the example communications interface 202, the example regional area identifier 204, the example demographic comparator 206, the example ratings calculator 208, and the example calibration factor calculator 210.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In the illustrated example, the mass storage devices 728 are used to implement the example panel tuning information database 212 and the example RPD tuning information database 214.

The coded instructions 732 of FIGS. 4-6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus and articles of manufacture have been disclosed that provide improved functionality for a processor or other computer device analyzing RPD tuning information collected from a local market area of interest by enabling the calculation of reliable ratings for media in the local market based on the RPD tuning information. Such ratings are reliably calculated by leveraging panel tuning information from a statistically sufficient number of panelist households in a larger regional area associated with the local market to generate calibration factors used to modify the initial RPD-based local rating to a final local rating that is representative of the entire population of the area of interest.

Example 1 includes an apparatus that includes a ratings calculator to calculate an initial local rating for media provided in a first geographic area based on local return path data (RPD) tuning information obtained from local RPD devices in subscriber households in the first geographic area. The subscriber households subscribe to a content provider that provides the media through the local RPD devices. The apparatus further includes a calibration factor calculator to calculate a nonsubscriber calibration factor based on a first panelist rating for the media corresponding to a first subset of panelist households that do not subscribe to the content provider. The ratings calculator modifies the initial local rating based on the nonsubscriber calibration factor to calculate a final local rating for the media in the first geographic area.

Example 2 includes the subject matter of Example 1, wherein the calibration factor calculator is to calculate a subscriber calibration factor based on a second panelist rating for the media corresponding to a second subset of the panelist households that subscribe to the content provider. The ratings calculator modifies the initial local rating based on the subscriber calibration factor.

Example 3 includes the subject matter of Example 2, wherein the second panelist rating is based on the media delivered to the second subset of the panelist households via devices for which RPD tuning information is not available.

Example 4 includes the subject matter of anyone of Examples 2 or 3, wherein the final local rating is based on a multiplication of the initial local rating and one plus the subscriber calibration factor.

Example 5 includes the subject matter of anyone of Examples 1-4, wherein the panelist households are located within a second geographic area larger than the first geographic area. The second geographic area contains the first geographic area.

Example 6 includes the subject matter of Example 5, wherein the apparatus further includes a demographic comparator to assign weights to the panelist households in the second geographic area to be demographically representative of a population of the first geographic area.

Example 7 includes the subject matter of anyone of Examples 5 or 6, wherein the ratings calculator is to determine a regional RPD-based rating for the media provided in the second geographic area based on regional RPD tuning information obtained from regional RPD devices associated with subscriber households in the second geographic area. The calibration factor calculator calculates the nonsubscriber calibration factor as a ratio of the first panelist rating to the regional RPD-based rating.

Example 8 includes the subject matter of Example 7, wherein the final local rating is based on a multiplication of the initial local rating, the nonsubscriber calibration factor, and a nonsubscriber penetration. The nonsubscriber penetration corresponds to one minus a percentage of the subscriber households in the first geographic area relative to all households in the first geographic area.

Example 9 includes the subject matter of anyone of Examples 1-8, wherein the ratings calculator is to calculate an adjusted local rating based on a partial coverage of the media in the first geographic area, and to calculate the final local rating based on the adjusted local rating.

Example 10 is a non-transitory computer readable medium that includes instructions that, when executed, cause a machine to at least determine an initial local rating for media provided in a first geographic area based on local return path data (RPD) tuning information obtained from local RPD devices in subscriber households in the first geographic area. The subscriber households subscribe to a content provider that provides the media through the local RPD devices. The instructions further cause the machine to calculate a nonsubscriber calibration factor based on a first panelist rating for the media corresponding to a first subset of panelist households that do not subscribe to the content provider. The instructions further cause the machine to modify the initial local rating based on the nonsubscriber calibration factor to calculate a final local rating for the media in the first geographic area.

Example 11 includes the subject matter of Example 10, wherein the instructions further cause the machine to calculate a subscriber calibration factor based on a second panelist rating for the media corresponding to a second subset of the panelist households that subscribe to the content provider. The instructions further cause the machine to modify the initial local rating based on the subscriber calibration factor.

Example 12 includes the subject matter of Example 11, wherein the second panelist rating is based on the media delivered to the second subset of the panelist households via devices for which RPD tuning information is not available.

Example 13 includes the subject matter of anyone of Examples 11 or 12, wherein the final local rating is based on a multiplication of the initial local rating and one plus the subscriber calibration factor.

Example 14 includes the subject matter of anyone of Examples 10-13, wherein the panelist households are located within a second geographic area larger than the first geographic area. The second geographic area contains the first geographic area.

Example 15 includes the subject matter of Example 14, wherein the instructions further cause the machine to assign weights to the panelist households in the second geographic area to be demographically representative of a population of the first geographic area.

Example 16 includes the subject matter of anyone of Examples 14 or 15, wherein the instructions further cause the machine to determine a regional RPD-based rating for the media provided in the second geographic area based on regional RPD tuning information obtained from regional RPD devices associated with subscriber households in the second geographic area. The instructions further cause the machine to calculate the nonsubscriber calibration factor as a ratio of the first panelist rating to the regional RPD-based rating.

Example 17 includes the subject matter of Example 16, wherein the final local rating is based on a multiplication of the initial local rating, the nonsubscriber calibration factor, and a nonsubscriber penetration. The nonsubscriber penetration corresponds to one minus a percentage of the subscriber households in the first geographic area relative to all households in the first geographic area.

Example 18 includes the subject matter of anyone of Examples 10-17, wherein the instructions further cause the machine to calculate an adjusted local rating based on a partial coverage of the media in the first geographic area. The instructions further cause the machine to calculate the final local rating based on the adjusted local rating.

Example 19 is a method that includes determining, by executing an instruction with a processor, an initial local rating for media provided in a first geographic area based on local return path data (RPD) tuning information obtained from local RPD devices in subscriber households in the first geographic area. The subscriber households subscribe to a content provider that provides the media through the local RPD devices. The method further including calculating, by executing an instruction with the processor, a nonsubscriber calibration factor based on a first panelist rating for the media corresponding to a first subset of panelist households that do not subscribe to the content provider. The method further including modifying, by executing an instruction with the processor, the initial local rating based on the nonsubscriber calibration factor to calculate a final local rating for the media in the first geographic area.

Example 20 includes the subject matter of Example 19, wherein the method also includes calculating a subscriber calibration factor based on a second panelist rating for the media corresponding to a second subset of the panelist households that subscribe to the content provider. The method further including and modifying the initial local rating based on the subscriber calibration factor.

Example 21 includes the subject matter of Example 20, wherein the second panelist rating is based on the media delivered to the second subset of the panelist households via devices for which RPD tuning information is not available.

Example 22 includes the subject matter of anyone of Examples 20 or 21, wherein the final local rating is based on a multiplication of the initial local rating and one plus the subscriber calibration factor.

Example 23 includes the subject matter of anyone of Examples 19-22, wherein the panelist households are located within a second geographic area larger than the first geographic area. The second geographic area contains the first geographic area.

Example 24 includes the subject matter of Example 23, wherein the method also includes assigning weights to the panelist households in the second geographic area to be demographically representative of a population of the first geographic area.

Example 25 includes the subject matter of anyone of Examples 23 or 24, wherein the method also includes determining a regional RPD-based rating for the media provided in the second geographic area based on regional RPD tuning information obtained from regional RPD devices associated with subscriber households in the second geographic area. The method further including calculating the nonsubscriber calibration factor as a ratio of the first panelist rating to the regional RPD-based rating.

Example 26 includes the subject matter of Example 25, wherein the final local rating is based on a multiplication of the initial local rating, the nonsubscriber calibration factor, and a nonsubscriber penetration. The nonsubscriber penetration corresponds to one minus a percentage of the subscriber households in the first geographic area relative to all households in the first geographic area.

Example 27 includes the subject matter of anyone of Examples 19-26, wherein the method further includes calculating an adjusted local rating based on a partial coverage of the media in the first geographic area. The method also including calculating the final local rating based on the adjusted local rating.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system for calculating media ratings in a region of interest comprising:
    a processor; and
    a non-transitory computer-readable storage medium, having stored thereon program instructions that, upon execution by the processor, cause performance of a set of operations comprising:
        determining a subscriber calibration factor for media based on first panel tuning information obtained from first metering devices in first panelist households that subscribe to a content provider that provides media through return path data (RPD) devices, wherein the first panel tuning information comprises an identifier of a respective RPD device of the RPD devices and an indication that the respective RPD device is capable of reporting a portion of the first panel tuning information;
        determining a nonsubscriber calibration factor for the media based on second panel tuning information obtained from second metering devices in second panelist households that do not subscribe to the content provider, the first and second panel tuning information associated with the media delivered to respective ones of the first and second panelist households via media devices for which RPD tuning information is not available; and
        determining a final rating for the media based on an initial rating for media provided in the region of interest, the subscriber calibration factor, and the nonsubscriber calibration factor, the initial rating based on RPD tuning information obtained from RPD devices in subscriber households of the region of interest, wherein the subscriber households subscribe to the content provider.

2. The computing system of claim 1, wherein the final rating is for the media provided in the region of interest as a first geographic area, the subscriber households are in the first geographic area, and the first and second panelist households are in a second geographic area different than the first geographic area.

3. The computing system of claim 2, wherein the second geographic area is larger than and contains the first geographic area.

4. The computing system of claim 2, wherein the operations further comprising assigning weights to the first and second panelist households to be representative of a population of the first geographic area.

5. The computing system of claim 4, wherein the weights are first weights, and the operations further comprising assigning second weights to the subscriber households to be representative of the population of the first geographic area.

6. The computing system of claim 2, wherein the subscriber households are first subscriber households, and the operations further comprising:
    determining an RPD-based rating for the media provided in the second geographic area based on RPD tuning information obtained from RPD devices associated with second subscriber households in the second geographic area; and
    determining the nonsubscriber calibration factor based on the RPD-based rating.

7. The computing system of claim 2, wherein the programmable circuitry is to:
    determine a non-RPD subscriber panelist rating for the media provided in the second geographic area based on the first panel tuning information; and
    determine the subscriber calibration factor based on the non-RPD subscriber panelist rating.

8. A non-transitory computer readable medium comprising instructions that, when executed, cause a processor to at least:
    determine a subscriber calibration factor for media based on first panel tuning information obtained from first metering devices in first panelist households that subscribe to a content provider that provides media through return path data (RPD) devices, wherein the first panel tuning information comprises an identifier of a respective RPD device of the RPD devices and an indication that the respective RPD device is capable of reporting a portion of the first panel tuning information;
    determine a nonsubscriber calibration factor for the media based on second panel tuning information obtained from second metering devices in second panelist households that do not subscribe to the content provider, the first and second panel tuning information associated with the media delivered to respective ones of the first and second panelist households via media devices for which RPD tuning information is not available; and
    determine a final rating for the media based on an initial rating for media provided in the region of interest, the subscriber calibration factor, and the nonsubscriber calibration factor, the initial rating based on RPD tuning information obtained from RPD devices in subscriber households of the region of interest, wherein the subscriber households subscribe to the content provider.

9. The non-transitory computer readable medium of claim 8, wherein the final rating is for the media provided in the region of interest as a first geographic area, the subscriber households are in the first geographic area, and the first and second panelist households are in a second geographic area different than the first geographic area.

10. The non-transitory computer readable medium of claim 9, wherein the second geographic area is larger than and contains the first geographic area.

11. The non-transitory computer readable medium of claim 9, wherein the instructions cause the machine to assign weights to the first and second panelist households to be representative of a population of the first geographic area.

12. The non-transitory computer readable medium of claim 11, wherein the weights are first weights, and the instructions cause the machine to assign second weights to the subscriber households to be representative of the population of the first geographic area.

13. The non-transitory computer readable medium of claim 9, wherein the subscriber households are first subscriber households, and the instructions cause the machine to:
    determine an RPD-based rating for the media provided in the second geographic area based on RPD tuning information obtained from RPD devices associated with second subscriber households in the second geographic area; and determine the nonsubscriber calibration factor based on the RPD-based rating.

14. The non-transitory computer readable medium of claim 9, wherein the instructions cause the machine to:
    determine a non-RPD subscriber panelist rating for the media provided in the second geographic area based on the first panel tuning information; and
    determine the subscriber calibration factor based on the non-RPD subscriber panelist rating.

15. A method comprising:
    determining, by executing instructions with a processor, a subscriber calibration factor for media based on first panel tuning information obtained from first metering devices in first panelist households that subscribe to a content provider that provides media through return path data (RPD) devices, wherein the first panel tuning information comprises an identifier of a respective RPD device of the RPD devices and an indication that the respective RPD device is capable of reporting a portion of the first panel tuning information;
    determining, by executing the instructions with the processor, a nonsubscriber calibration factor for the media based on second panel tuning information obtained from second metering devices in second panelist households that do not subscribe to the content provider, the first and second panel tuning information associated with the media delivered to respective ones of the first and second panelist households via media devices for which RPD tuning information is not available; and
    determining, by executing the instructions with the processor, a final rating for the media based on an initial rating for media provided in the region of interest, the subscriber calibration factor, and the nonsubscriber calibration factor, the initial rating based on RPD tuning information obtained from RPD devices in subscriber households of the region of interest, wherein the subscriber households subscribe to the content provider.

16. The method of claim 15, wherein the final rating is for the media provided in the region of interest as a first geographic area, the subscriber households are in the first geographic area, and the first and second panelist households are in a second geographic area different than the first geographic area.

17. The method of claim 16, wherein the second geographic area is larger than and contains the first geographic area.

18. The method of claim 16, further including assigning weights to the first and second panelist households to be representative of a population of the first geographic area.

19. The method of claim 18, wherein the weights are first weights, and the method further includes assigning second weights to the subscriber households to be representative of the population of the first geographic area.

20. The method of claim 16, wherein the subscriber households are first subscriber households, and the method further includes:
    determining an RPD-based rating for the media provided in the second geographic area based on RPD tuning information obtained from RPD devices associated with second subscriber households in the second geographic area; and
    determining the nonsubscriber calibration factor based on the RPD-based rating.

* * * * *